(12) United States Patent
Li et al.

(10) Patent No.: US 7,423,826 B2
(45) Date of Patent: Sep. 9, 2008

(54) READBACK SYSTEM PROVIDING A COMBINED SAMPLE OUTPUT INCLUDING MULTIPLE SAMPLES PER BIT

(75) Inventors: Shaoping Li, Naperville, IL (US); Jin Insik, Eagan, MN (US); Kaizhong Gao, Eden Prairie, MN (US); Song Xue, Edina, MN (US); Mike Montemorra, Longmont, CO (US); Housan Dakroub, Savage, MN (US); Jason C. Jury, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 379 days.

(21) Appl. No.: 11/373,742

(22) Filed: Mar. 10, 2006

(65) Prior Publication Data

US 2007/0211362 A1 Sep. 13, 2007

(51) Int. Cl.
*G11B 20/10* (2006.01)
(52) U.S. Cl. .......................... 360/39; 360/46
(58) Field of Classification Search ................ None
See application file for complete search history.

(56) References Cited

U.S. PATENT DOCUMENTS

| | | | |
|---|---|---|---|
| 3,448,400 A | 6/1969 | Wiegand | 340/174 |
| 4,075,671 A | 2/1978 | Cheatham et al. | 360/113 |
| 4,112,408 A | 9/1978 | Roozenbeek | 338/32 |
| 4,150,314 A | 4/1979 | Zabler et al. | 310/155 |
| 4,374,403 A | 2/1983 | Oshima et al. | 360/113 |
| 6,005,753 A | 12/1999 | Fontana, Jr. et al. | 360/113 |
| 6,172,832 B1 * | 1/2001 | Dovek et al. | 360/66 |
| 6,275,363 B1 | 8/2001 | Gill | 360/324.2 |
| 6,445,171 B2 | 9/2002 | Sandquist et al. | 324/117 |
| 6,473,275 B1 | 10/2002 | Gill | 360/314 |
| 6,566,856 B2 | 5/2003 | Sandquist et al. | 324/117 |
| 6,633,461 B2 | 10/2003 | Gill | 360/314 |
| 6,661,620 B2 | 12/2003 | Seigler et al. | 360/314 |
| 6,670,809 B1 | 12/2003 | Edelstein et al. | 324/244 |
| 2003/0179481 A1 | 9/2003 | McNeil et al. | 360/48 |
| 2003/0184918 A1 | 10/2003 | Lin et al. | 360/314 |
| 2004/0017639 A1 | 1/2004 | Deak | 360/290 |
| 2006/0002032 A1 | 1/2006 | Li et al. | 360/315 |

OTHER PUBLICATIONS

*Magnetic Recording Handbook*, Marvin Camras, Van Nostrand Reinhold Co. Inc, 1988, "Magnetic Modulator Heads," pp. 236-239.
*Magnetic Disk Drive Technology*, Kanu G. Ashar, IEEE Press,1997, "8.2 Functions of a Channel," pp. 198-200.
*Electronic Designer's Handbook*, L.G. Giacoletto, McGraw-Hill Book Company, 1977, Section 13.16g, "Hall Effect Magnetoresistive Modulators," pp. 13-145 through 13-146.

* cited by examiner

*Primary Examiner*—Andrea Wellington
*Assistant Examiner*—Varsha A Kapadia
(74) *Attorney, Agent, or Firm*—Westman, Champlin & Kelly, P.A.

(57) ABSTRACT

A readback system includes a magnetic sensor that receives a sensor current. The magnetic sensor senses magnetic bits at a bit frequency and generates a sensor output. The readback system includes a channel circuit that modulates the sensor current at a modulation frequency higher than the bit frequency. The channel circuit samples the sensor output and combines multiple samples of the sensor output per magnetic bit into a combined sample output.

20 Claims, 14 Drawing Sheets

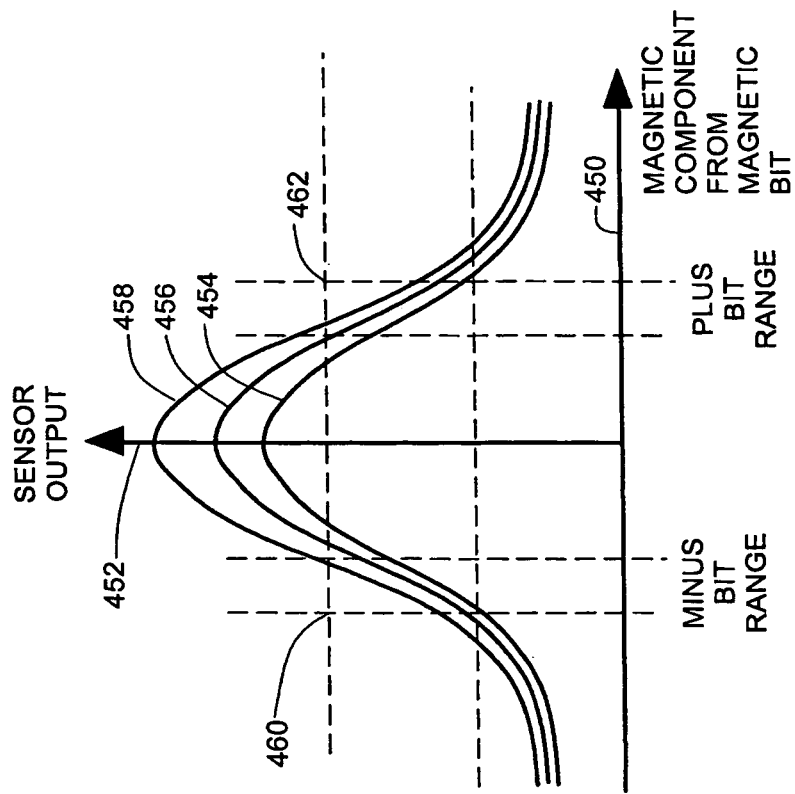
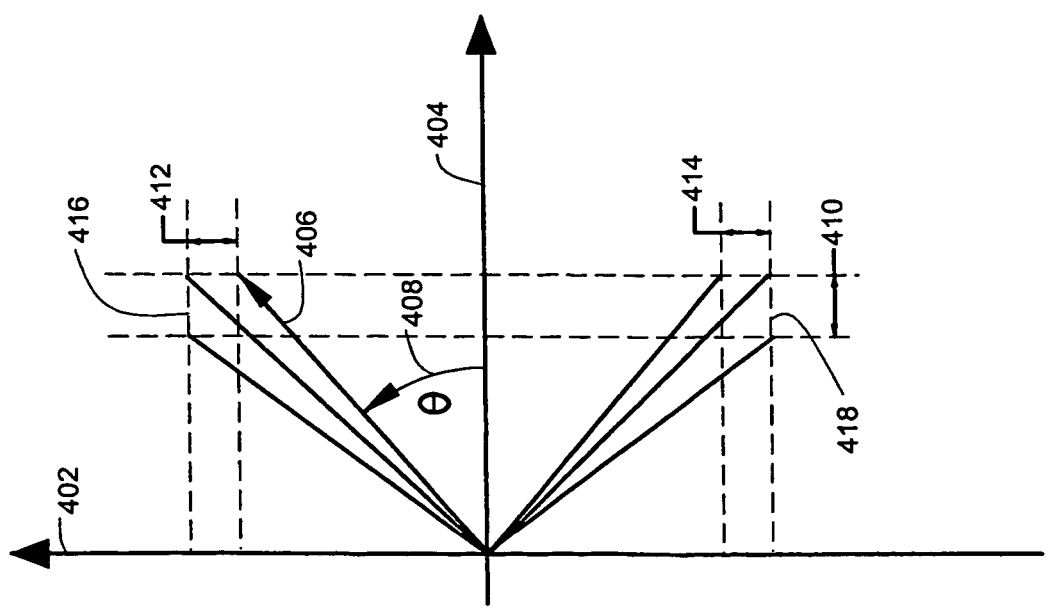
FIG. 4B
FIG. 4A

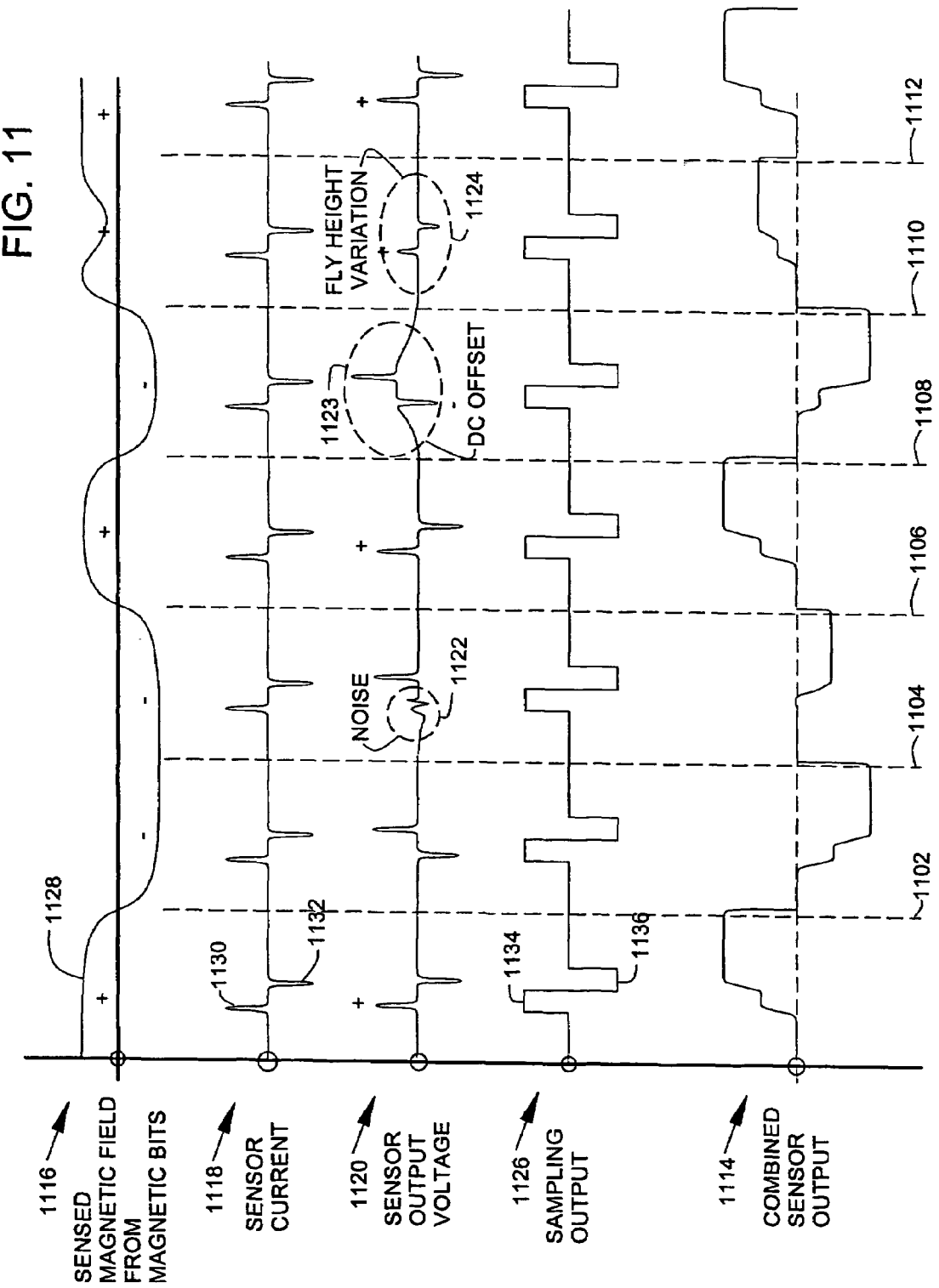

READBACK SYSTEM PROVIDING A COMBINED SAMPLE OUTPUT INCLUDING MULTIPLE SAMPLES PER BIT

FIELD OF THE INVENTION

The present invention relates generally to read channels for data storage devices, and more particularly but not by limitation to a readback portion of a read channel in a perpendicular recording channel.

BACKGROUND OF THE INVENTION

Data storage devices such as disc drives utilize relative motion between a read/write head and a data track to record and reproduce a serial stream of digital data bits. The digital data is stored as binary saturated magnetic bits that produce an external field that is sensed by the read head. Signals from the read head are low level and subject to interference from noise from a variety of noise sources during the reproduction process.

Read and write channels in disc drives are complex and consume a large amount of the power budget of a disc drive. Power is consumed in error correction and modulation encoding and decoding. Filtering and amplification of analog sensor signals is extensive and consumes a large amount of power.

Methods and apparatus are needed to provide reading of binary saturated data with improved signal-to-noise (S/N) ratio and reduced power consumption by error correction and modulation encoding and decoding circuitry. Embodiments of the present invention provide solutions to these and other problems, and offer other advantages over the prior art.

SUMMARY OF THE INVENTION

Disclosed is a readback system. The readback system comprises a magnetic sensor. The magnetic sensor receives a sensor current. The magnetic sensor senses magnetic bits at a bit frequency. The magnetic sensor generates a sensor output.

The readback system comprises a channel circuit. The channel circuit modulates the sensor current at a modulation frequency higher than the bit frequency. The channel circuit samples the sensor output. The channel circuit combines multiple samples of the sensor output per magnetic bit into a combined sample output.

Other features and benefits that characterize embodiments of the present invention will be apparent upon reading the following detailed description and review of the associated drawings.

BRIEF DESCRIPTION OF THE DRAWINGS

FIG. 4A illustrates internal field components in a magnetoresistive element.

FIG. 4B illustrates a magnetoresistive element output as a function of a magnetic field component from a magnetic bit and as a function of sensor current.

FIG. 11 illustrates an exemplary timing diagram that includes pulse modulation.

DETAILED DESCRIPTION OF ILLUSTRATIVE EMBODIMENTS

In the embodiments described below, a readback system is arranged to take multiple samples of a magnetic bit at different times. The information concerning the polarity of the bit is generally the same in each of the multiple samples, but noise levels vary in each sample. The multiple samples are combined into a combined sample output. In the combined sample output, the information concerning the polarity of the bit tends to add, while the noise tends to cancel out.

A magnetic sensor is used that provides a sensor output that comprises a product of a sensed magnetic field from a magnetic bit passing the sensor, and a sensor current provided to the magnetic sensor. The magnetic sensor senses magnetic bits at a bit frequency. The magnetic sensor generates a sensor output.

The sensor current is modulated at a modulation frequency that is higher than a bit frequency of bits passing the magnetic sensor. The sensor output includes information in a band around the modulation frequency. In one preferred embodiment, the polarity of the sensor signal alternates and DC offset noise tend to cancel out in the combined output. Narrow band filtering around the modulation frequency can be used to filter out noise components at frequencies other than the bit frequency. Any of a variety of know modulation methods can be used. Continuous sine wave modulation can be used to provide narrow bandwidth. Pulse modulation can be provided to allow for low overhead direct digital demodulation.

The readback system comprises a channel circuit. The channel circuit modulates the sensor current at a modulation frequency higher than the bit frequency. The channel circuit samples the sensor output. The channel circuit combines multiple samples of the sensor output per magnetic bit into a combined sample output. The sampling and combining of multiple samples can be done using any of a variety of known demodulation methods that are compatible with the modulation method that is used.

The embodiments are particularly useful with perpendicular recording media, patterned media and media in which binary saturated fields of recorded magnetic bits passing a magnetic sensor are read sequentially. The reduced levels of noise and errors allow for the use of simplified detectors and low power error correction encoders and decoders. The combined output provides a voltage output level that is higher than that of conventional channel circuits. The need for amplification and filtering of analog signals before detection is greatly reduced.

Figure 1:
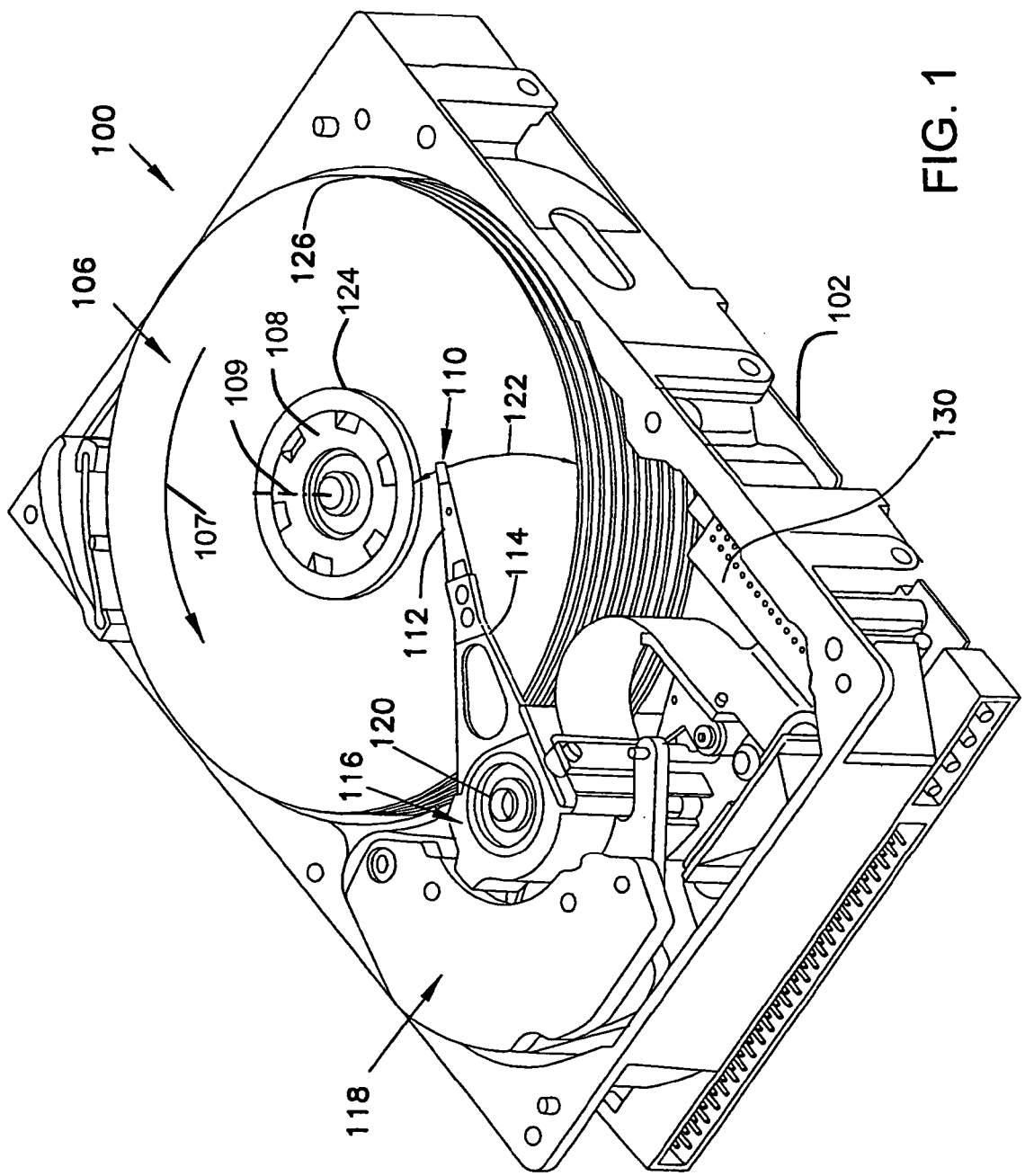
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
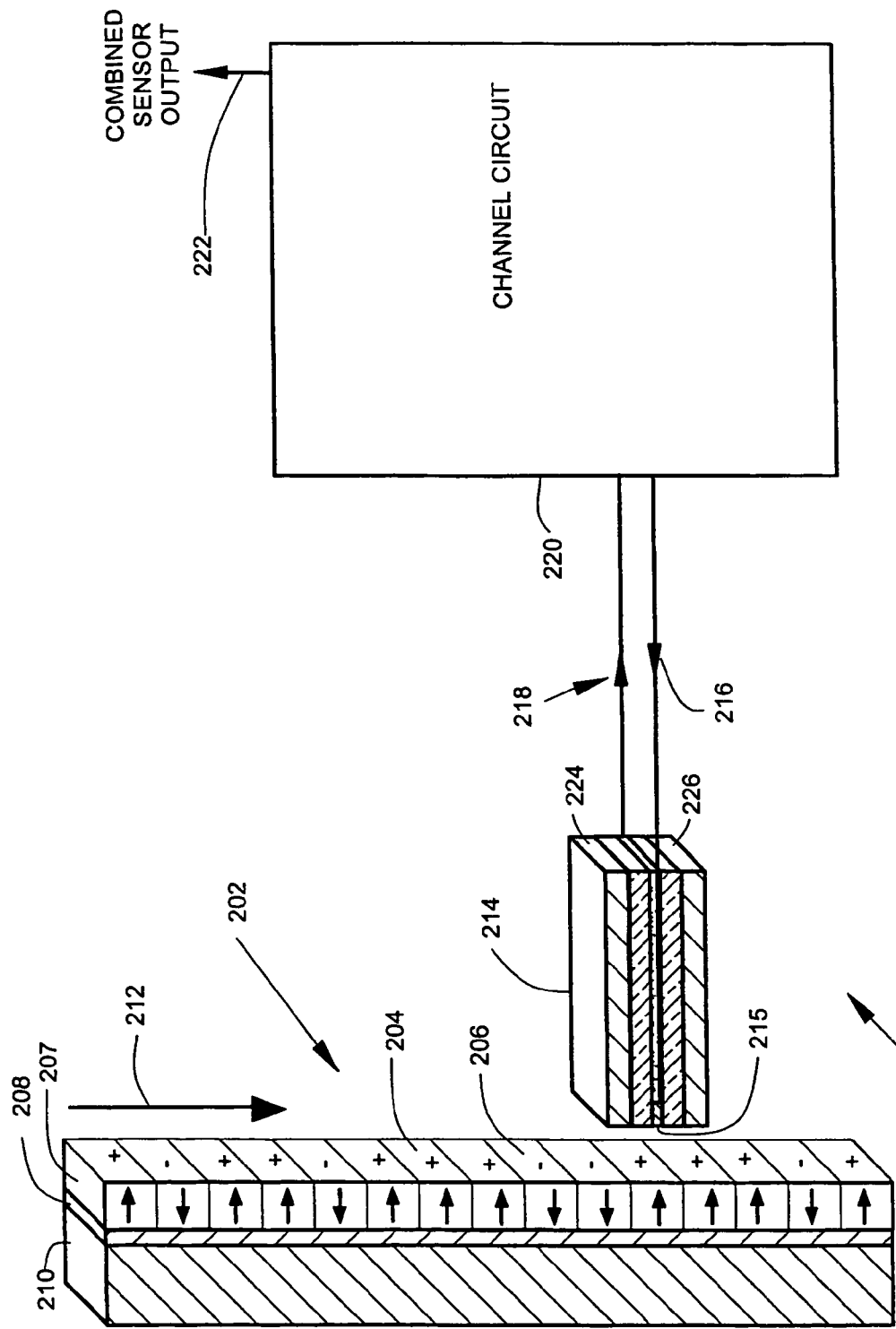
FIG. 2 illustrates a readback system that reads magnetic bits stored on magnetic media.

FIG. 2 illustrates a readback system 200 that reads magnetic bits stored on magnetic media 202. The magnetic media 202 typically comprises one or more discs such as discs in disc pack 106 in FIG. 1. In FIG. 2, only a small portion of a track of perpendicularly recorded magnetic bits is shown. It is understood, however, that each disc includes a large number of concentric tracks that each concentric track include a large number of magnetic bits that represent user data and can also represent servo data for use in head positioning. Data is recorded on magnetic media 202 as a series of binary saturated plus (+) magnetic bits 204, and minus (−) magnetic bits 206 that generate external magnetic fields that can be sensed.

The magnetic media 202 typically includes a magnetic storage layer 207, a soft underlayer 208 and a substrate layer 210 and can include other layers known to be used in digital magnetic recording. The magnetic media 202 moves as indicated by arrow 212 past a magnetic sensor 214. The individual + and − magnetic bits 204, 206 move past the magnetic sensor 214. Magnetic bits are sensed by the magnetic sensor 214 at a bit frequency F1 bits per second. The bit frequency F1 can be calculated as a product of track velocity (inches per second) times linear bit density (bits per inch).

The magnetic bits 204, 206 are binary saturated bits, and thus the information in each bit is sensed from the direction (+ or −) of the external field produced by each magnetic bit 204, 206.

The readback system includes the magnetic sensor 214. The magnetic sensor 214 receives a sensor current 216. The magnetic sensor 214 senses magnetic bits 204, 206 at the bit frequency F1. The magnetic sensor 214 generates a sensor output 218. The sensor output 218 comprises a mathematical product of the amplitude of the sensed external field of the magnetic bits and the amplitude of the sensor current 216. The sensor current 216 varies with time or is modulated at a frequency F2 that is higher than the bit frequency F1. The magnetic sensor 214 preferably operates in a linear range such that the response of the sensor output 218 is linear with respect to the range of saturated levels of the magnetic bits, and such that the response of the sensor output 218 is linear with respect to the range of amplitudes of the sensor current 216. Magnetic sensor 214 preferably operates as a linear multiplier.

Magnetic sensor 214 comprises a magnetoresistive sensing element 215. The positioning of shields layers 224, 226 of the magnetic sensor 214 is set to match the range of bit widths encountered on the magnetic media 202 to optimize sensing of a single bit width. Typically, the sensor current 216 flows to the magnetoresistive sensing element 215 on a pair of leads, and the sensor output 218 comprises a voltage (or resistance) that is sensed on the same pair of leads. The magnetoresistive sensing element 215 changes its electrical voltage as a function of sensed magnetic field and sensor current.

The readback system includes a channel circuit 220. The channel circuit 220 modulates the sensor current 216 at a modulation frequency F2 that is higher than the bit frequency F1. The channel circuit 220 samples the sensor output 218 at a frequency higher than the bit frequency F1. The channel circuit 220 combines multiple samples of the sensor output 218 per magnetic bit into a combined sample output. In one embodiment, the modulation of the sensor current 218 comprises a continuous wave (CW) type of modulation, and the sampling comprises a CW demodulator circuit. In another embodiment, the modulation of the sensor current 218 comprises pulse modulation, and the sampling comprises pulse sampling. Other known types of modulation and sampling can be used as well. The channel circuit generates a combined sensor output 222.

The sensor output 222 is "combined" in the sense that data is taken at least at two different sample times from each magnetic bit and combined into a combined output bit. The taking of data indicating the polarity of a magnetic bit at two different times produces the same information with respect to the magnetic bit itself, but typically reproduces different noise conditions at the two different sampling times. When multiple samples are combined, noise from one sample is a smaller part of the combined sample, and signal-to-noise ratio is improved. The channel circuit 200 is described in more detail below by way of an example illustrated in FIGS. 3-13.

Figure 3:
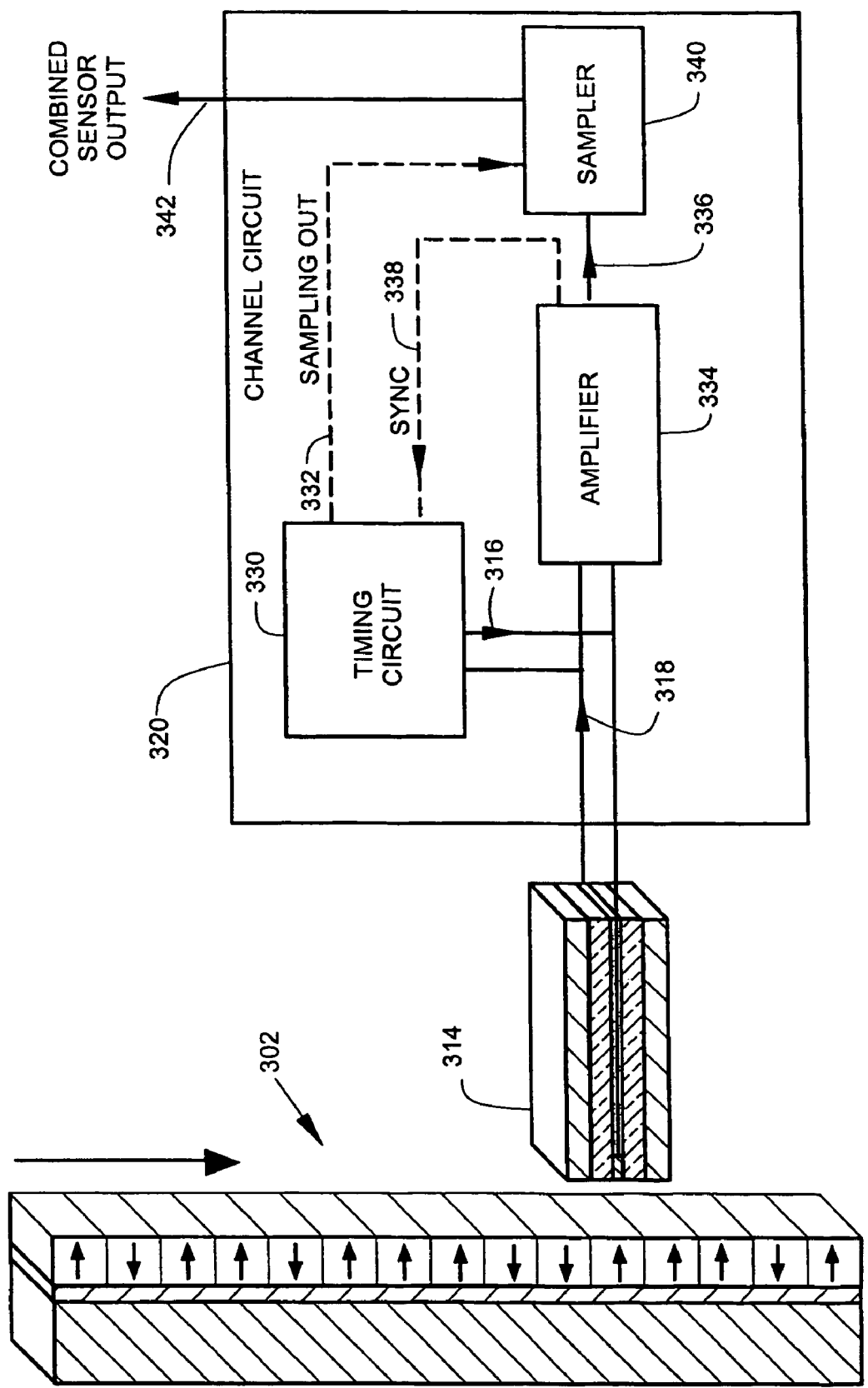
FIG. 3 illustrates a channel circuit that couples to a magnetic sensor.

FIG. 3 illustrates a channel circuit 320 that couples to a magnetic sensor 314. The magnetic sensor 314 senses saturated binary magnetic bits on moving magnetic media 302. The magnetic sensor 314 is comparable to the magnetic sensor 214 in FIG. 2.

The channel circuit 320 comprises a timing circuit 330. The timing circuit 330 generates modulation timing that modulates a sensor current 316 at a timing frequency F2 that is a multiple of a bit frequency F1. The timing circuit 330 generates a sampling output 332 that defines multiple sample times per magnetic bit.

The channel circuit 320 preferably includes an amplifier 334. The amplifier 334 receives a sensor output 318 and generates an amplified sensor output 336. The amplifier 334 is preferably a variable gain amplifier (VGA) that has a gain that adjust automatically to provide a standardized output level in spite of variations in temperature and fly height of the magnetic sensor 314. The amplifier 334 also preferably includes filtering out of noise at frequencies higher than F2. The amplifier 324 preferably provides a synchronization output 338 to the timing circuit 330 for synchronizing the timing of the sensor current 316 with the sensing of magnetic bits. In one embodiment, the amplified sensor output 336 serves as the synchronization output 338. The timing circuit 330 preferably receives an amplified sample 338 of the sensor output 318, and the timing circuit 330 synchronizes the timing of the modulation of the sensor current 316 during a synchronization interval as a function of the amplified sample 338. The timing circuit 330 can also generate an optional sampling output 332.

A sampler circuit 340 receives the amplified sensor output 336. The sampler circuit 340 can also receive the optional sampling output 332. The amplified sensor output 336 is sampled at multiple times per bit, and the different times of sampling can be controlled by the sampling output 332. The sampler circuit 340 generates a combined sensor output 342 in which the multiple samples per magnetic bit are combined into a single sample per magnetic bit. Autosynchronous sampling can also be used, in which case the sampling output 332 is not needed.

In one embodiment, the modulation of the sensor output 318 comprises continuous sine wave modulation, and the sampler 340 comprises a synchronous demodulator that averages over multiple cycles of sine wave. In another embodiment, the modulation of the sensor output 318 comprises pulse modulation, and the sampler 340 comprises synchronous sampler that combines multiple pulse samples. Other known modulation and demodulation techniques can also be used.

FIG. 4A illustrates internal field components in a magnetoresistive element (such as element 215 in FIG. 2). In FIG. 4A, a vertical axis 402 represents a first magnetic field component from a magnetic bit that is sensed by the magnetoresistive element. A horizontal axis 404 represents a second magnetic field component due to a sensor current flowing through the magnetoresistive element. As illustrated, the first and second magnetic field components are generally mechanically orthogonal to one another.

The first and second magnetic field components add vectorially to form an internal magnetic field with a magnitude (such as vector 406) and a directional angle (such as angle theta ($\theta$) at 408). The sensor current is modulated in an amplitude range such that the second magnetic field component varies over a narrow modulation range 410. The binary saturated property of a bit keeps the first magnetic component in two narrow range 412 (for + magnetic bits) or a narrow range 414 (for − magnetic bits). The internal field operates in narrow angular ranges that are centered in a direction of either about +45 degrees or −45 degrees as illustrated. The internal field operates in narrow amplitude operating ranges represented by rectangles 416, 418. In these narrow operating ranges, the output of the magnetoresistive sensor is approximately a mathematical product of the sensed field and the modulated sensor current. In these operating ranges, the magnetoresistive sensor functions as a modulator that shifts baseband magnetic bit data around a bit frequency F1 to a higher frequency band around modulation frequency F2.

FIG. 4B illustrates a magnetoresistive element output as a function of a magnetic field component from a magnetic bit and as a function of sensor current. A horizontal axis 450 represents a first field component from a magnetic bit. A vertical axis 452 represents sensor output. Parametric curves 454, 456, 458 represent sensor current levels. Rectangular operating regions 460, 462 are set in regions of steep, generally linear slopes of the parametric curves 454, 456, 458. The sensor output is approximately a linear product of the magnitude of the sensor current and magnitude of the sensed magnetic field in the operating regions 460, 462. A magnitude of the sensor current and a magnitude of a magnetic field from the magnetic bits are preferably small enough such that the sensor output comprises amplitudes that do not exceed a quasi-linear range of the sensor output.

Figure 5:
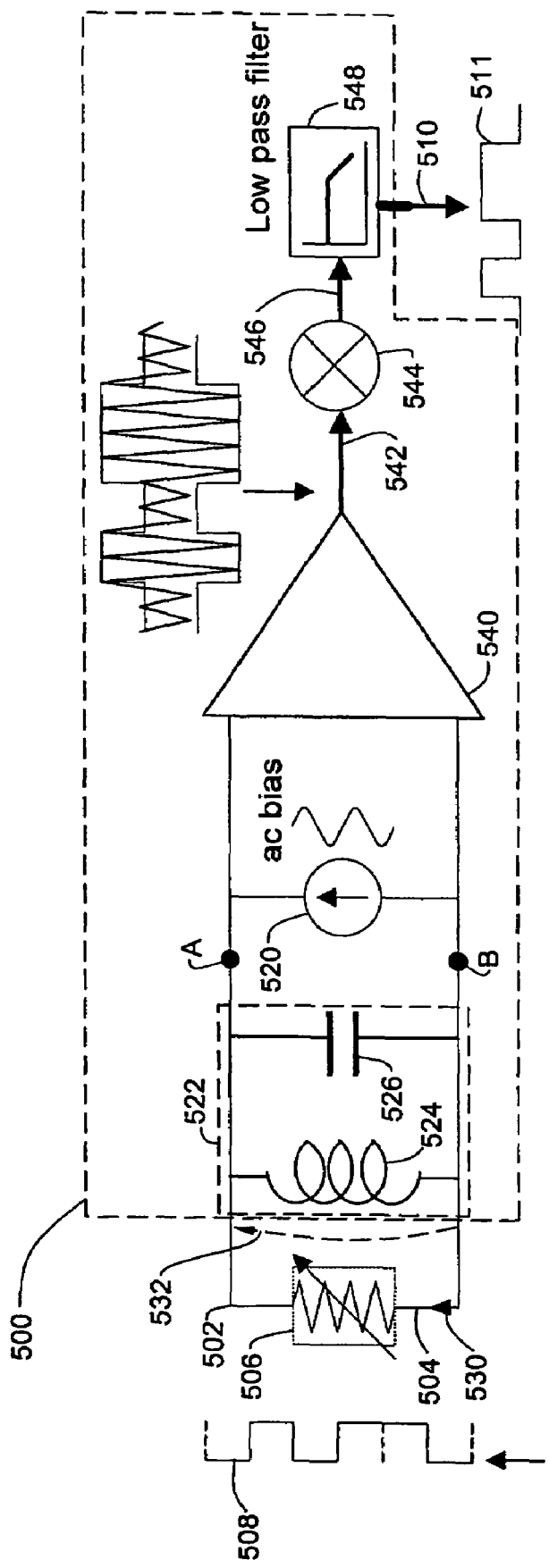
FIG. 5 illustrates a simplified circuit diagram of a channel circuit.

FIG. 5 illustrates a simplified circuit diagram of a channel circuit 500. The channel circuit 500 connects via leads 502, 504 to a magnetoresistive sensor 506. The magnetoresistive sensor 506 senses a serial stream of saturated binary magnetic bits 508 at a bit frequency F1. The channel circuit 500 generates a combined sensor output 510. The combined sensor output 510 reproduces the serial stream of magnetic bits as an electrical output waveform 511 with 1 and 0 logic levels.

The channel circuit 500 includes a current source 520 that provides a generally sinusoidal output current at a frequency F2 which is greater than bit frequency F1. The current source 520 couples to a resonant circuit 522. The resonant circuit 522 comprises an inductor 524 and a capacitance 526. The capacitance 526 can comprise at least some stray capacitance from other parts of the circuit. The resonant circuit 522 resonates at or close to the frequency F2. The current source 520 and the resonant circuit 522 together provide a sensor current 530 to the magnetoresistive sensor 506. The magnetoresistive sensor 506 can include magnetic biasing structures that provide additional magnetic field components that bias the magnetoresistive element in a linear multiplying range.

The magnetoresistive sensor 506 generates a modulated sensor output resistance 532 that is coupled across the resonant circuit 522. The modulated sensor output resistance 532 loads the resonant circuit 522 and effectively modulates the quality factor (Q) of the resonant circuit 522 with the magnetic bit waveform at frequency F1. The sinusoidal voltage on the resonant circuit 522 is at the higher (carrier) frequency F2 and is amplitude modulated by the magnetic bit waveform at the lower bit frequency F1.

A differential amplifier 540 receives the sinusoidal voltage on the resonant circuit 522 and provides an amplified output 542. The amplified output 542 is coupled to a demodulator 544. The demodulator 544 is preferable a synchronous demodulator that is self-synchronized (also called zero beat or homodyne synchronization). Non-synchronous or envelope-detecting demodulators can be used as well. The demodulator 544 provides a demodulated signal 546 that includes multiple samples taken at different times during each magnetic bit. The multiple samples are preferably spaced apart by non-sampling time intervals. The demodulate signal 546 is provided to a low-pass filter 548. The low-pass filter 548 combines the multiple samples into a filtered waveform in which noise has been suppressed by combining the multiple samples. The low pass filter 548 provides the combined sensor output 510.

The circuit 500 includes resonant circuit 522 on a left side of circuit nodes A, B. The resonant circuit 522 includes only passive electrical components that can be conveniently located near the magnetoresistive sensor 506. The capacitance 526 can in some applications comprise stray lead capacitance rather than a discrete component. Circuitry on a right side of nodes A, B in FIG. 5 includes active electrical components that use connections to power supplies, and such circuitry is conveniently located on a printed circuit board.

Figure 6:
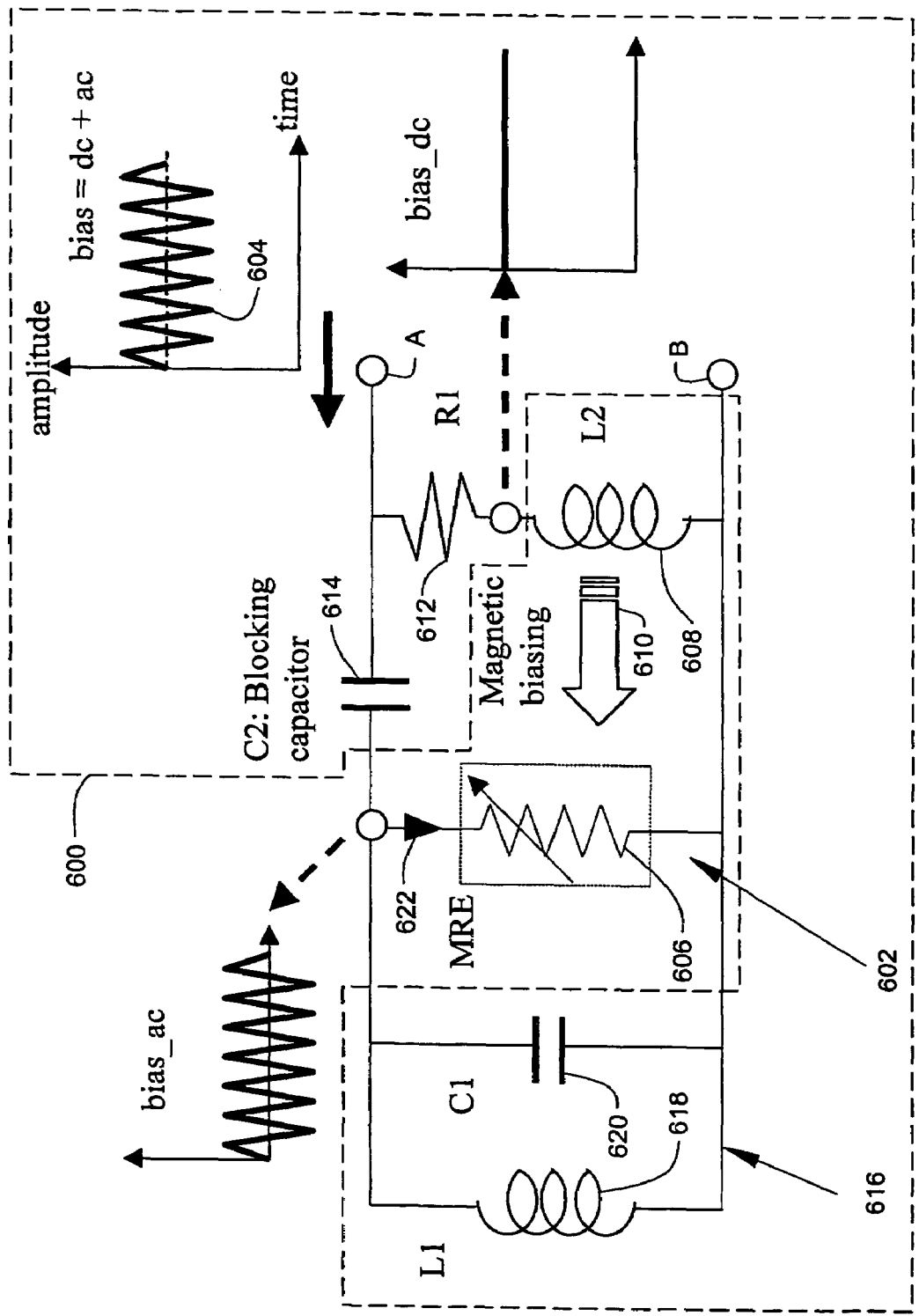
FIG. 6 illustrates a simplified circuit diagram of a portion of a channel circuit.

FIG. 6 illustrates a simplified schematic diagram of a circuit portion 600 of a channel circuit. The circuit portion 600 illustrated in FIG. 6 comprises only passive components on the left side of nodes A, B and can be conveniently located near a magnetoresistive sensor 602. The nodes A, B in FIG. 6 are couplable to additional circuitry similar to that shown to the right side of nodes A, B of FIG. 5 to form a channel circuit. A current source (such as current source 520 in FIG. 5) provides a current waveform as illustrated at 604 in FIG. 6 to circuit portion 600. An amplifier (such as amplifier 540 in FIG. 5) comprises an AC amplifier that does not amplify DC voltage due to the DC bias portion of the current waveform illustrated at 604.

The magnetoresistive sensor 602 comprises a magnetoresistive element 606 and a DC bias winding (L2) 608. A DC current through the DC bias winding 602 generates a magnetic bias field 610 to magnetically bias the magnetoresistive element 606.

The bias winding 608, which is inductive, is coupled in series with a resistor (R1) 612. The bias winding 608 and resistor 612 form a low pass LR circuit that conducts a DC portion of current waveform 604. The low pass LR circuit filters out most of the AC portion of current waveform 604. The magnetoresistive sensor 602 include a magnetic biasing structure (bias winding 608) that provides an additional magnetic field component (magnetic biasing 610) that biases the magnetoresistive element 606 in a linear multiplying range.

A blocking capacitor (C2) 614 blocks the DC portion of current waveform 604. The capacitor 614 is coupled in series with the magnetoresistive element 606 to form a high pass RC circuit that conducts a portion of the AC portion of current waveform 604 through the magnetoresistive element 606. A resonant circuit 616 comprises an inductor 618 and a capacitance 620. The capacitance 620 can comprise at least some stray capacitance from other parts of the circuit. The resonant circuit 616 resonates at or close to the frequency F2, which is the frequency of the AC component in waveform 604. The current source (which provides current waveform 604 and the resonant circuit 616 together provide an AC sensor current 622 to the magnetoresistive element 606.

The magnetoresistive element 606 senses a serial stream of saturated binary magnetic bits at a bit frequency F1. The magnetoresistive element 606 generates a modulated sensor output resistance that is coupled across the resonant circuit 616. The modulated sensor output resistance loads the resonant circuit 616 and effective modulates the quality factor (Q) of the resonant circuit 616 with the magnetic bit waveform at frequency F1. The sinusoidal voltage on the resonant circuit 616 is at a higher (carrier) frequency F2 and is amplitude modulated by the magnetic bit waveform at the lower bit frequency F1. The modulated voltage on the resonant circuit 616 and the magnetoresistive element 606 is coupled to nodes A, B for coupling to an amplifier as described above.

Figure 7A:
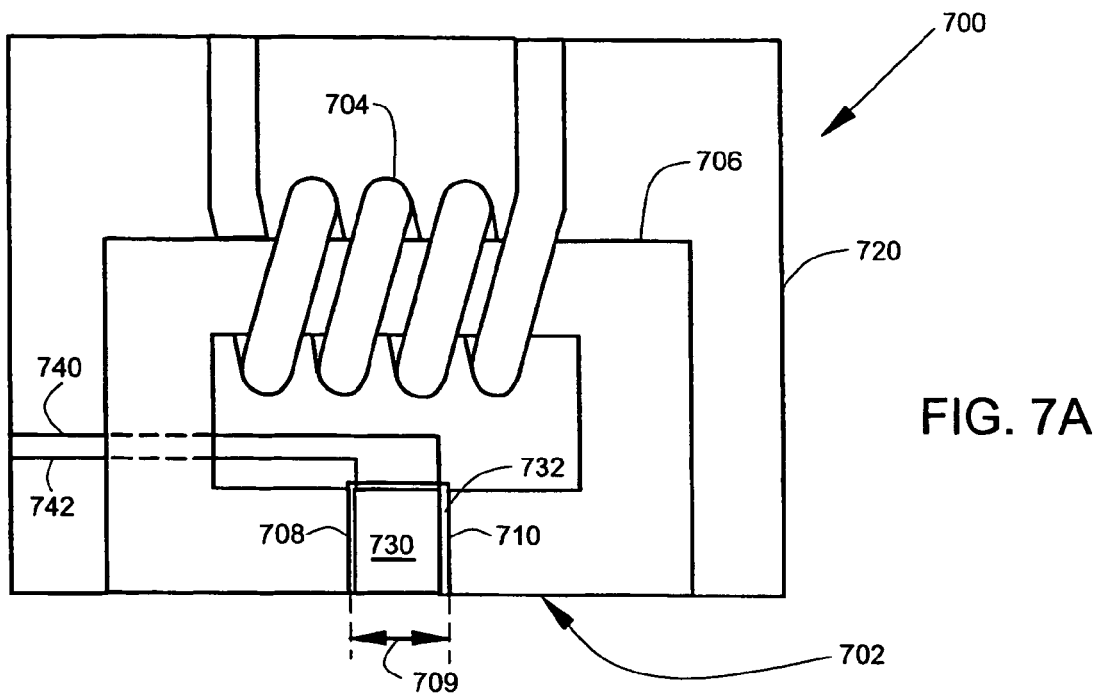
FIG. 7A illustrates a cross-sectional elevational view of a magnetoresistive sensor.
Figure 7B:
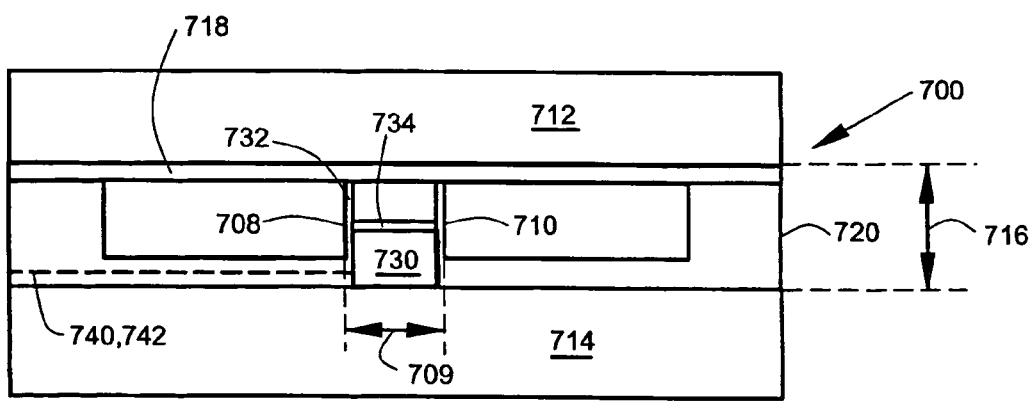
FIG. 7B illustrates a bottom view of the magnetoresistive sensor in FIG. 7A.

FIG. 7A illustrates a cross-sectional elevational view of a magnetoresistive sensor 700. FIG. 7B illustrates a bottom view (in other words, a view of an air bearing surface 702) of the magnetoresistive sensor 700. The magnetoresistive sensor 700 includes a magnetic biasing winding 704, and can be used, for example, as the magnetoresistive sensor 602 shown schematically in FIG. 6. The magnetic bias winding 704 is wrapped around a central region of a generally C-shaped core 706 that is formed of soft magnetic material.

In a first embodiment, the C-shaped core 706 has magnetic flux levels that are less than magnetic saturation levels for the core 706. The C-shaped core has an operating range in which magnetic flux generated in a gap 709 between poles 708, 710 of the core 706 is generally linear with respect to electric current passing through the winding 704. The winding 704 can carry DC current, AC carrier current, or both AC modulation current and DC current, depending on the needs of the application.

In a second embodiment, the C-shaped core 706 has magnetic flux levels that are at or above magnetic saturation levels. The C-shaped core generates a relatively fixed saturation level of magnetic flux in the gap 709 between the poles 708, 710 of the core 706 when electric current passing through the winding 704 is high enough to saturate the core 706. The DC magnetic bias is set by the core properties (core material and core dimensions) and the core 706 provides only DC bias. In this second embodiment, AC modulation is applied to the sensor current.

The magnetoresistive sensor 700 includes a top shield layer 712 and a bottom shield layer 714. The shield layers 712, 714 are formed of soft magnetic material and there is a gap 716 between the shield layers 712, 714. The gap 716 is approximately the width of a magnetic bit on the magnetic media and provides "mechanical equalization" for limiting sensing to one magnetic bit at a time.

A magnetoresistive element 730 is centrally positioned in the gap 709 between the poles 708, 710 and in the gap 716 between the shields 712, 714. The magnetoresistive element 730 includes a free layer 734 that extends between the poles 708, 710. The magnetoresistive element 730 is separated from the poles 708, 710 by an insulating layer 732. The insulating layer 732 is preferably alumina or an organic insulation material. The core 706 and the winding 704 are surrounded by an insulating layer 720 that is preferably alumina or an organic insulation material A non-magnetic metallic layer 718 is provided on the top shield layer 712 in the gap 716. The non-magnetic metallic layer 718 reduces direct magnetic coupling between the top shield layer 712 and the core 706. A pair of leads 740, 742 from the magnetoresistive element 730 are provided for carrying a sensor current and providing a sensor output voltage. The magnetoresistive element 730 is magnetically biased by a magnetic field component from the coil 704 and core 706. The magnetoresistive element 730 is magnetically biased by a magnetic field component due to the sensor current passing through the magnetoresistive element 730. Magnetic bits (not illustrated in FIGS. 7A, 7B) move past the magnetoresistive element 730 and generate the baseband modulation of the sensor output on leads 740, 742. The magnetic field component provided by the winding 704 and core 706 provide a generally steady (DC) level of magnetic field and a carrier modulation is added to the generally DC level by higher frequency modulation of the sensor current through leads 740, 742.

Figure 8A:
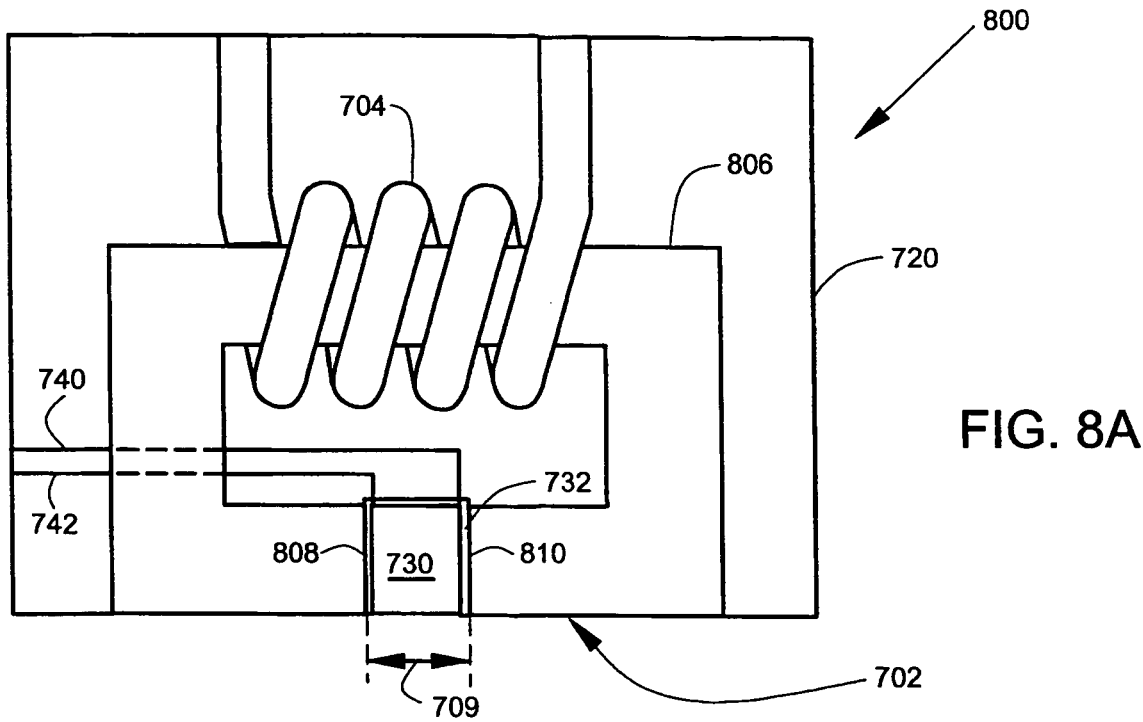
FIG. 8A illustrates a cross-sectional elevational view of a magnetoresistive sensor.
Figure 8B:
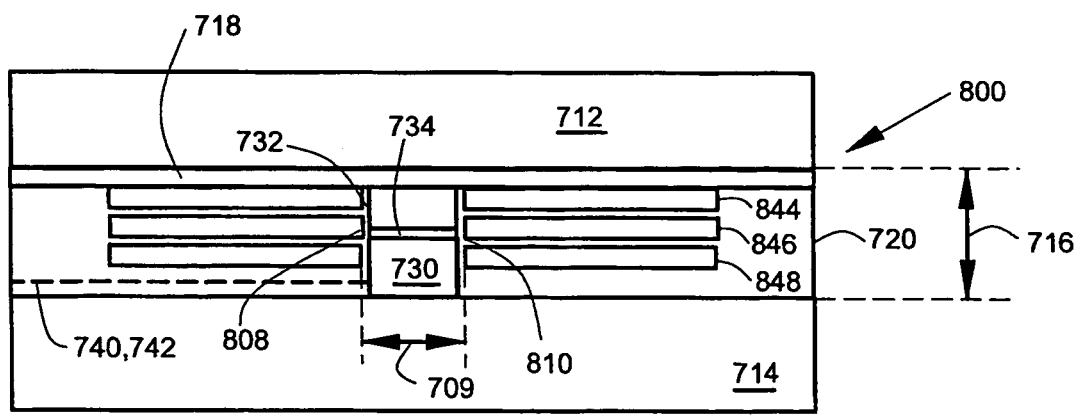
FIG. 8B illustrates a bottom view of the magnetoresistive sensor in FIG. 8A.

FIG. 8A illustrates a cross-sectional elevational view of a magnetoresistive sensor 800. FIG. 8B illustrates a bottom view (in other words, a view of an air bearing surface 702) of the magnetoresistive sensor 800. Reference numbers used in FIGS. 8A, 8B that are the same as reference numbers used in FIGS. 7A, 7B identify the same features. The magnetoresistive sensor 800 is generally similar to the magnetoresistive sensor 700 except that the magnetoresistive sensor 800 has a core 806 that is laminated and includes laminations 844, 846, 848 separated by electrically insulating material. Poles 808, 810 are laminated. In other respects, the sensor 800 is the same as the sensor 700. Lamination of the core 806 reduces core losses at higher frequencies and increases the maximum useful modulation frequency for currents in winding 704.

Figure 9A:
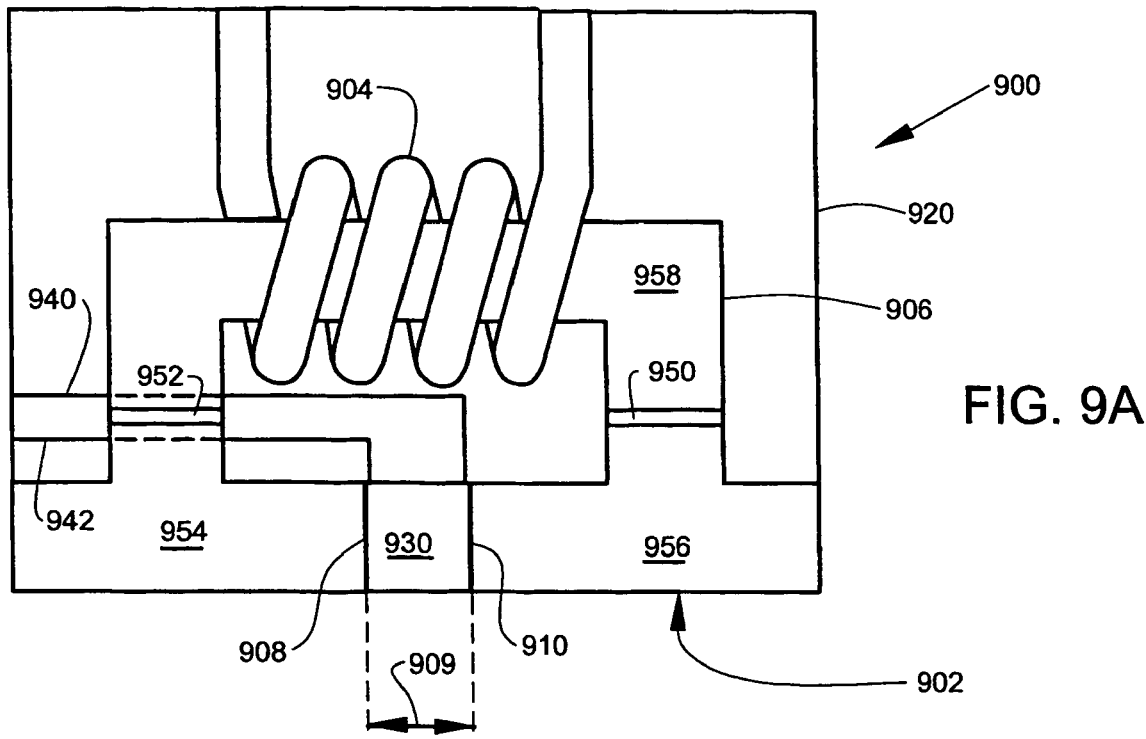
FIG. 9A illustrates a cross-sectional elevational view of a magnetoresistive sensor.
Figure 9B:
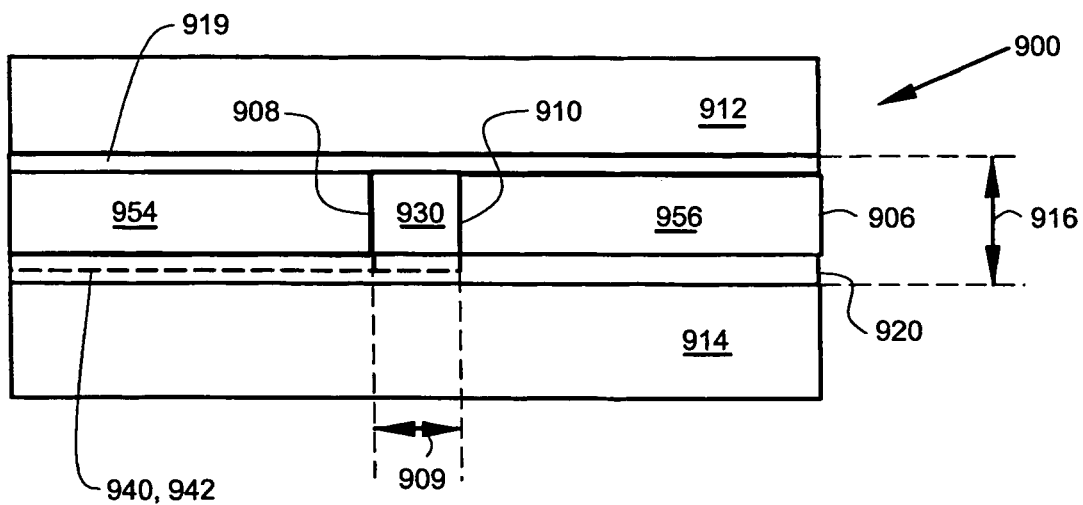
FIG. 9B illustrates a bottom view of the magnetoresistive sensor in FIG. 9A.

FIG. 9A illustrates a cross-sectional elevational view of a magnetoresistive sensor 900. FIG. 9B illustrates a bottom view (in other words, a view of an air bearing surface 902) of the magnetoresistive sensor 900. The magnetoresistive sensor 900 includes a magnetic biasing winding 904, and can be used, for example, as the magnetoresistive sensor 602 shown schematically in FIG. 6. The magnetic bias winding 904 is wrapped around a central region of a generally C-shaped core 906 that is formed of soft magnetic material. The generally C-shaped core 906 is not continuous, but is provided with gaps 950, 952 that are filled with electrically insulation material. The core 906 includes core portions 954, 956, 958 that are electrically insulated from one another. The electrical insulation prevents flow of undesired electrical leakage current from magnetoresistive sensor element 930 through the core 906. The magnetoresistive sensing element 930 can electrically contact poles 908, 910 without risk of short circuit through the core 906. An insulation layer (such as insulation layer 732 in FIG. 7) between the poles 908, 910 and the magnetoresistive element 930 is not required. The winding 904 can carry DC, AC modulation, or both AC modulation an DC current as described above in connection with FIG. 7. The core 906 can be laminated as described above in connection with FIG. 8.

The magnetoresistive sensor 900 includes a top shield layer 912 and a bottom shield layer 914. The shield layers 912, 914 are formed of soft magnetic material and there is a gap 916 between the shield layers 912, 914. The gap 916 is approximately the width of a magnetic bit on the magnetic media and provides "mechanical equalization" for limiting sensing to one magnetic bit at a time.

The magnetoresistive element 930 is centrally positioned in the gap 909 between poles 908, 910 and in the gap 916 between the shields 912, 914. The core 906 and the winding 904 are surrounded by an insulating layer 920 that is preferably alumina or an organic insulation material An insulation layer 919 is provided on the top shield layer 912 in the gap 916. The insulation layer 919 electrically insulates the top shield layer 912 from the core 906. A pair of leads 940, 942 from the magnetoresistive element 930 are provided for carrying a sensor current and providing a sensor output voltage. The magnetoresistive element 930 is magnetically biased by a magnetic field component from the coil 904 and core 906. The magnetoresistive element 930 is magnetically biased by a magnetic field component due to the sensor current passing through the magnetoresistive element 930. Magnetic bits (not illustrated in FIGS. 9A, 9B) move past the magnetoresistive element 930 and generate the baseband modulation of the sensor output on leads 940, 942. The magnetic field component provided by the winding 904 and core 906 provide a generally steady (DC) level of magnetic field and a carrier modulation is added to the generally DC level by higher frequency modulation of the sensor current through leads 940, 942.

Figure 10A:
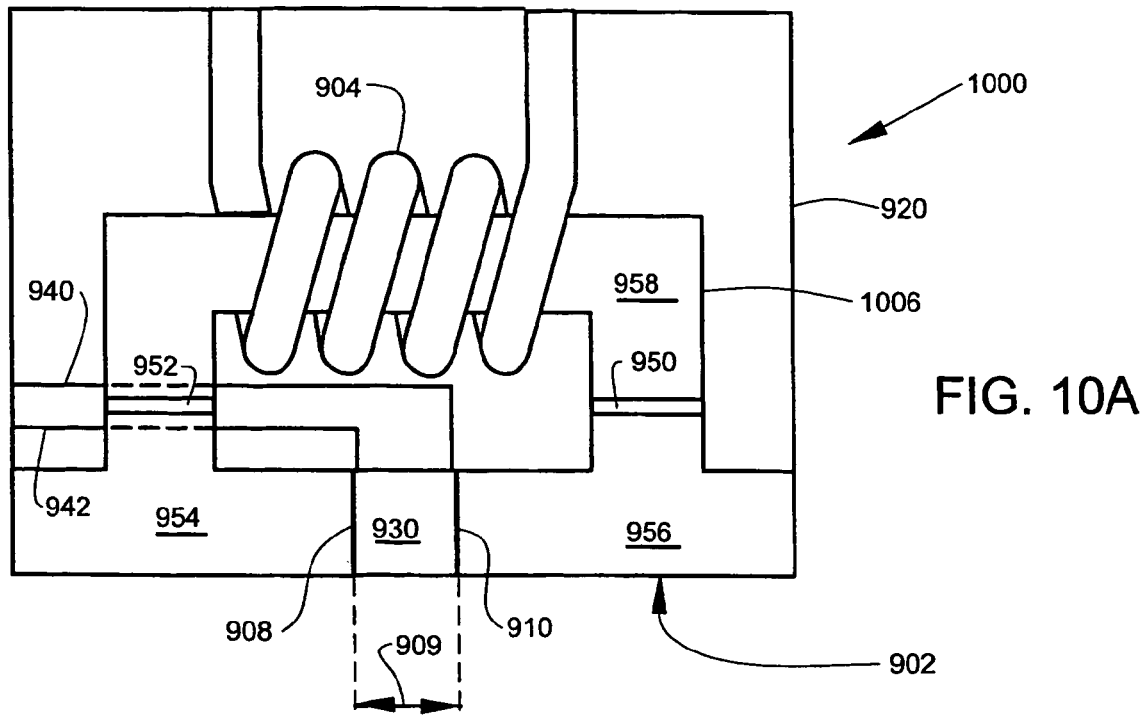
FIG. 10A illustrates a cross-sectional elevational view of a magnetoresistive sensor.
Figure 10B:
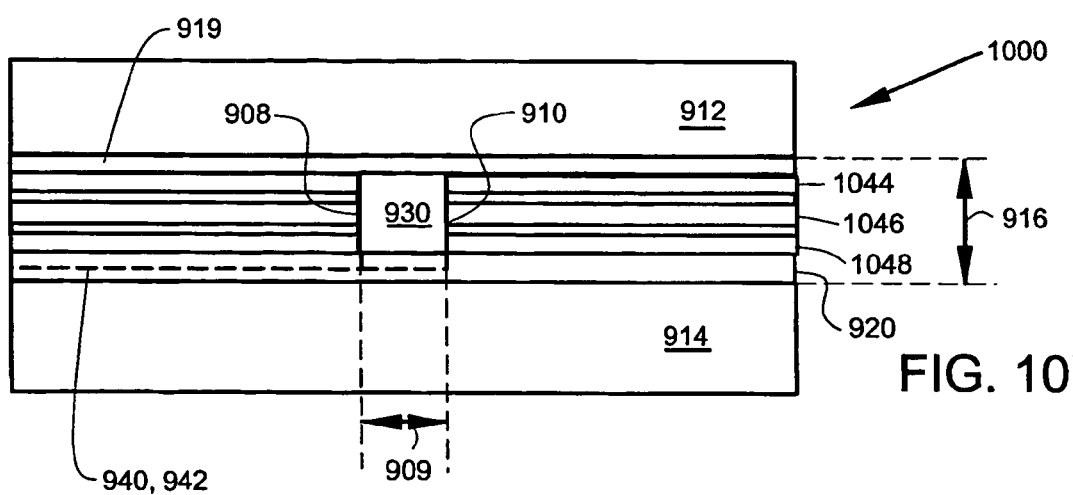
FIG. 10B illustrates a bottom view of the magnetoresistive sensor in FIG. 10A.

FIG. 10A illustrates a cross-sectional elevational view of a magnetoresistive sensor 1000. FIG. 10B illustrates a bottom view (in other words, a view of an air S bearing surface 902) of the magnetoresistive sensor 1000. Reference numbers used in FIGS. 10A, 10B that are the same as reference numbers used in FIGS. 9A, 9B identify the same features. The magnetoresistive sensor 1000 is generally similar to the magnetoresistive sensor 900 except that the magnetoresistive sensor 1000 has a core 1006 that is laminated and includes laminations 1044, 1046, 1048 separated by electrically insulating material. In other respects, the sensor 1000 is the same as the sensor 900. Lamination of the core 1006 reduces core losses at higher frequencies and increases the maximum useful modulation frequency for currents in winding 704.

Figure 10C:
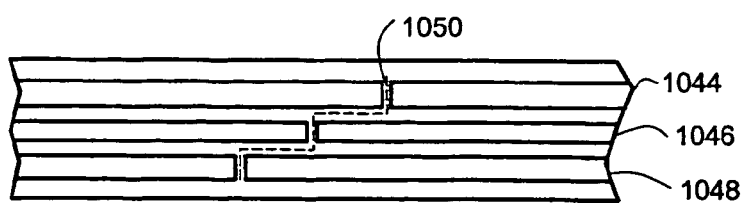
FIG. 10C illustrate an alternate staggered embodiment of a gap 950 filled with insulation material.

FIG. 10C illustrate an alternate embodiment of the gap 950 (FIGS. 9A, 10A) filled with insulation material. In the alternative embodiment shown in FIG. 10C, a gap 1050 is staggered for successive laminations. The staggering reduces magnetic reluctance compared with the gap 950 (or gap 952) while still maintaining electrical insulation.

FIG. 11 illustrates an exemplary timing diagram that includes pulse modulation that can be used in connection with the channel circuit described above in connection with FIG. 3. In FIG. 11, the horizontal axes of the timing diagram represent time, and the vertical axes represent amplitudes of signals. Vertical dashed lines 1102, 1104, 1106, 1108, 1110, 1112 indicate times at which a channel detector (not illustrated in FIG. 11) samples the combined sensor output 1114.

A sensed magnetic field 1116 that is received by magnetic sensor (such as magnetic sensor 314 in FIG. 3) includes positive and negative amplitudes representing bits of data. The sensed magnetic field is generated as magnetic bits of perpendicularly recorded magnetic media pass by the magnetic sensor. The magnetic sensor receives a pulse modulated sensor current (such as sensor current 316 in FIG. 3) as illustrated at 1118. The magnetic sensor generates a sensor output voltage as illustrated at 1120. The sensor output voltage at 1120 is generally a product of the sensed magnetic field at 1116 and the sensor current at 1118. The sensor output at 1120 also includes noise 1122, a DC offset 1123 ("base line noise"), and a reduced amplitude sensor output voltage at 1124 due to a fly height variation.

The sensor output at 1120 is amplified by an amplifier (such as amplifier 334 in FIG. 3) and an amplified sensor output is coupled to a sampler (such as sampler 340 in FIG. 3). The sampler receives a sampling output 1126 (such as sampling output 332 in FIG. 3). The sampling output waveform includes multiple sampling pulses at different times for each magnetic bit as illustrated. The sampling output is typically generated by a timing circuit (such as timing circuit 330) that is synchronized with an amplified sensor output voltage (such as synchronization output 338 in FIG. 3). Synchronization of the timing circuit is preferably accomplished during a synch or servo interval when a predetermined sequence (such as 0101010 . . . ) of magnetic bits is sensed. In one preferred embodiment, the pulse modulation timing is varied or is turned off during synchronization.

During each sensing of a single magnetic bit 1128, the sensor current 1118 includes + and − current modulation pulses 1130, 1132. The sampling output 1126 includes multiple + and − sampling pulses 1134, 1136 corresponding to the + and − current modulation pulses. The sampling is differential such that base line noise (DC offset) and slowly changing DC levels automatically cancel out at the combined sensor output 1114.

The combined sensor output 1114 shows how multiple sensor output pulses are combined or added in the combined sensor output 1114. The effects of noise 1122, DC offset 1123 and fly height variation 1124 are shown in the combined sensor output As illustrated, combining two samples of + and − pulses of sensor output voltage 1120 tend to provide a combined sensor output 1114 that has the correct polarity for the particular magnetic bit sensed, in spite of the presence of many type of noise. Multiple samples of weak magnetic sensor signals are combined, and sensor signals that would otherwise be to weak or noisy to use can be effectively used with the techniques described. The level of sensor current can be reduced to reduce heating of the head, resulting in lower temperature and increased head reliability.

In FIG. 11, the number of pulses of sensor current 1118 can alternatively comprise three or more pulses per magnetic bit. In FIG. 11, the sampling output 1126 can alternatively comprise single polarity sampling pulses on two lines, with one line indicating + sampling and the other line indicating − sampling.

Figure 12A:
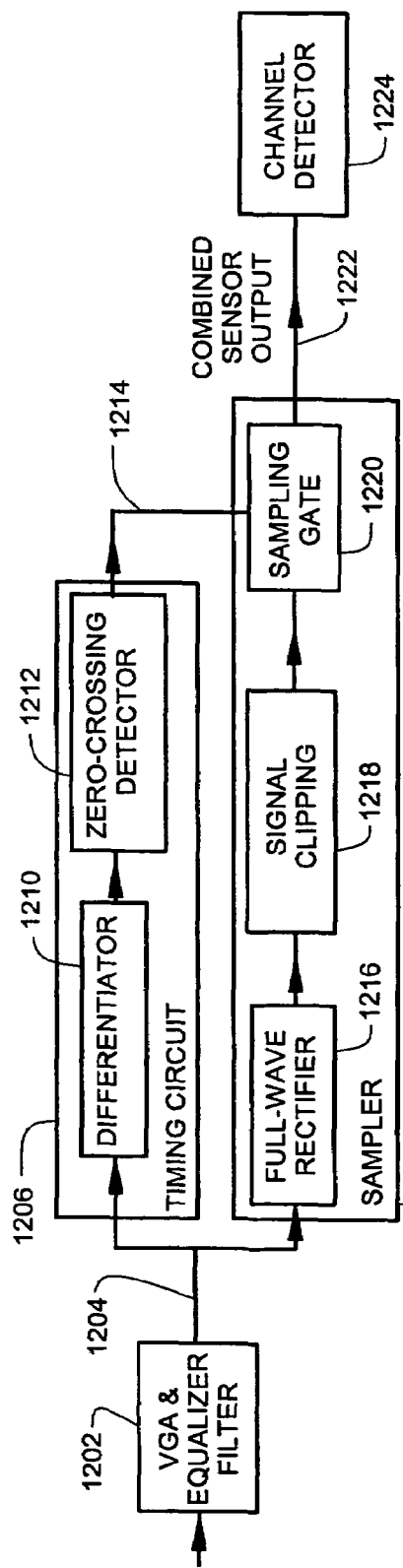
FIGS. 12A, 12B illustrate exemplary circuit details of timing circuits and sampler circuits.
Figure 12B:
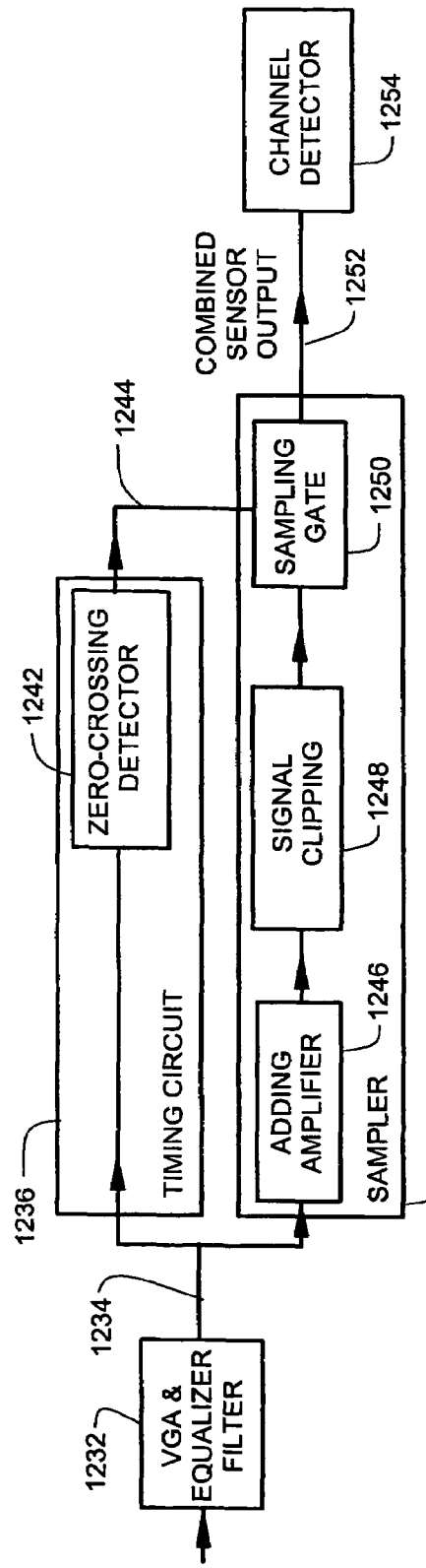

FIGS. 12A, 12B illustrate exemplary circuit details of timing circuits and sampler circuits such as timing circuit 330 and sampling circuit 340 in FIG. 3. In FIG. 12A, an amplifier 1202 couples an amplified sensor output 1204 to a timing circuit 1206 and a sampler circuit 1208. The timing circuit 1206 includes a differentiator 1210 and a zero crossing detector 1212 connected in cascade. The zero crossing detector 1212 provides a sampling output 1214.

The sampler circuit 1208 comprises a full-wave rectifier 1216, a signal dipping circuit 1218 and a sampling gate 1220 that are connected in cascade. The sampling gate 1220 also receives the sampling output 1214. The sampling gate 1220 provides a combined sensor output 1222 to a channel detector 1224. The channel detector 1224 can be a hard decision or soft decision detector and can use known techniques of error correction such as Viterbi detection and turbo detection.

In FIG. 12B, an amplifier 1232 couples an amplified sensor output 1234 to a timing circuit 1236 and a sampler circuit 1238. The timing circuit 1236 includes a zero crossing detector 1242. The zero crossing detector 1242 provides a sampling output 1244.

The sampler circuit 1238 comprises an adding amplifier 1246, a signal clipping circuit 1248 and a sampling gate 1250 that are connected in cascade. The sampling gate 1250 also receives the sampling output 1244. The sampling gate 1250 provides a combined sensor output 1252 to a channel detector 1254. The channel detector 1254 can be a hard decision or soft decision detector and can use known techniques of error correction such as Viterbi detection and turbo detection.

Figure 13:
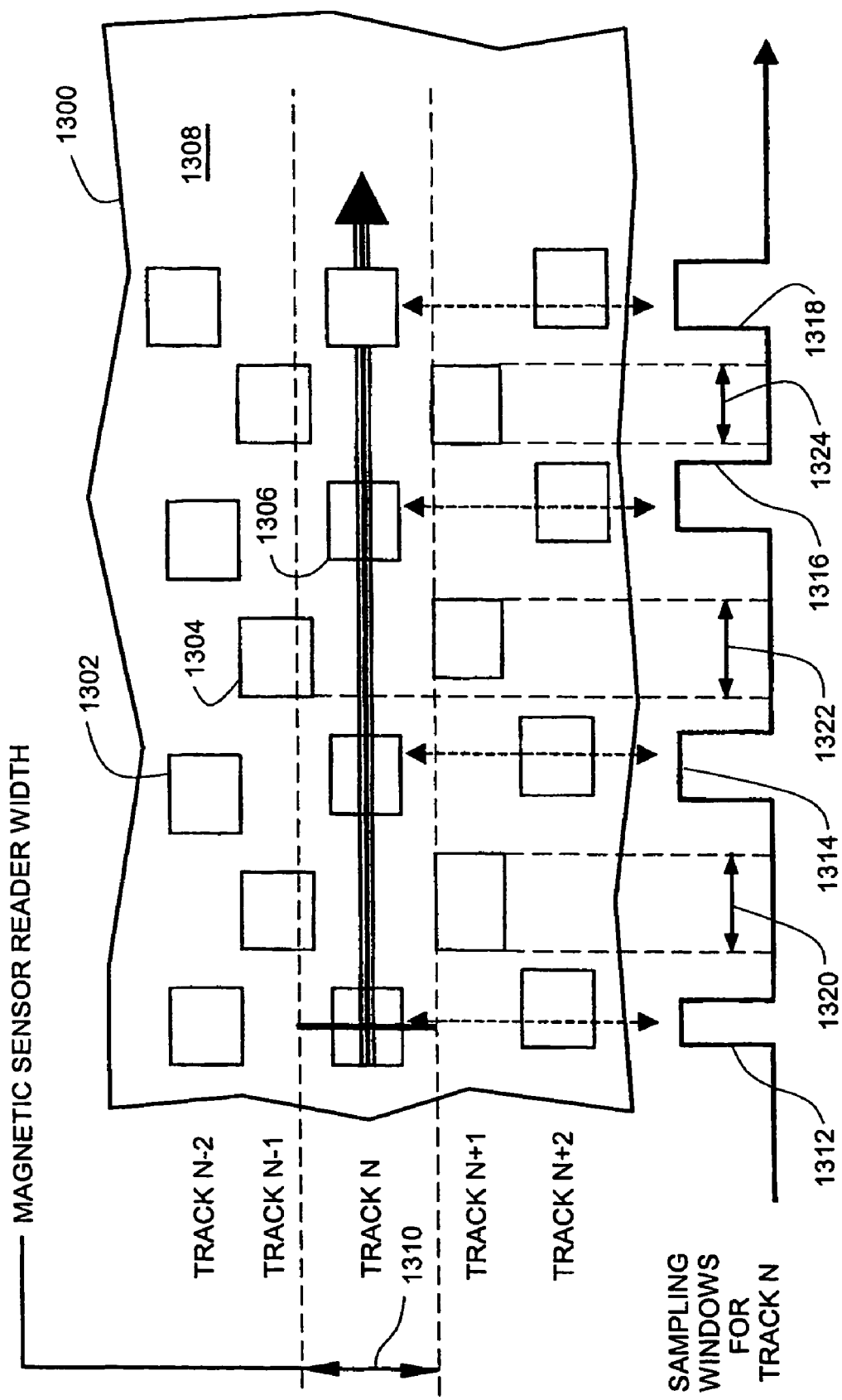
FIG. 13 illustrates tracks of patterned media.

FIG. 13 illustrates an extremely small part of a surface of a storage media disc 1300 that includes portions of tracks N−2, N−1, N and N+1, N+2 of patterned media. Individual bits of information are recorded on land areas (represented by rectangles) such as land areas 1302, 1304, 1306. The land areas comprise material that is magnetizable to record data. The land areas are separated from one another by a trough area 1308. The trough area 1308 comprises material that is not magnetizable to record data. As illustrated in FIG. 13, land areas in one track are staggered relative to land areas in adjacent tracks. When a magnetic reader is reading land areas in track N, for example, the reader can have a track width 1310 that is wide enough to partially overlap land areas in adjacent tracks N−1 or N+1 or both adjacent tracks. With use of the circuits described above in connection with FIGS. 2-12, sampling is performed at multiple times while a bit is being sensed in track N, but sampling is not performed when a bit is not being sensed in track N. Sampling thus occurs only during sampling time windows 1312, 1314, 1316, 1318 when bits are sensed, and does not occur when staggered, partially overlapping bits from adjacent tracks are being sensed at 1320, 1322, 1324 are being sensed due to overlap. The time sampling intervals have corresponding spatial sampling intervals along the length of the track. The sampling arrangements of FIGS. 2-12 thus effectively eliminate noise interference due to sensor overlap of staggered adjacent tracks on patterned media.

Figure 14:
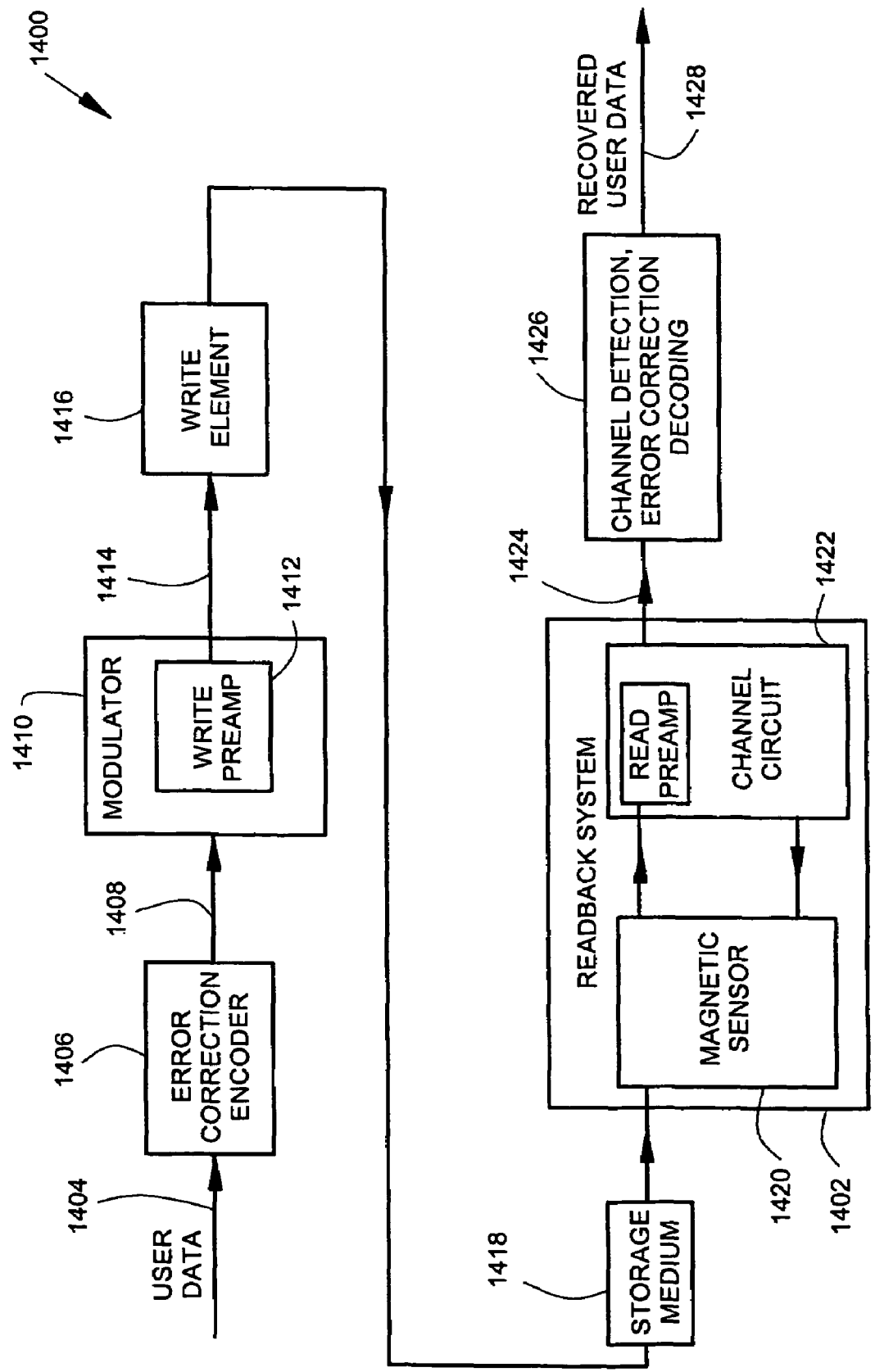
FIG. 14 illustrates an exemplary storage channel in which the readback system can be utilized.

FIG. 14 illustrates an exemplary storage channel 1400 in which a readback system 1402 can be utilized. User data 1404 is provided to an error correction encoder 1406. The error correction encoder 1406 generates error-error correction-encoded data 1408 which is applied to a channel modulator 1410. A write preamplifier 1412 in the channel modulator 1410 generates channel-modulation-encoded data 1412. Channel modulation encoding adapts the data for writing by write element 1416 to the storage medium 1418. The type of channel modulation used depends on the characteristics of the write element 1416, the storage medium 1418 and a magnetic sensor 1420. Channel modulation encoding can include run length limited encoding, dc free encoding and some types of equalization encoding. Channel modulation encoding (and decoding) are processes that are distinct from, and not to be confused with, modulation and demodulating processes performed in the readback system 1402. In the case of perpendicular recording, channel modulation encoding may be minimal or not used.

The readback system 1402 includes the magnetic sensor 1420 and a channel circuit 1422. The channel circuit 1422 generates a combined sensor output 1424. The combined sensor output 1424 can be configured to be compatible with channel detection and error correction encoding 1426. The combined sensor output 1424 can be a hard decision output, a soft decision output or other know type of output applied to a channel detector. The channel detection and error correction coding 1426 provides a recovered user output 1428.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms m which the appended claims are expressed. For example, the particular elements may vary depending on the particular application for the channel circuit while maintaining substantially the same functionality without departing from the scope and spirit of the present invention. In addition, although the preferred embodiment described herein is directed to a magnetic storage system for perpendicularly recorded digital data, it will be appreciated by those skilled in the art that the teachings of the present invention can be applied to many types of digital magnetic recording, without departing from the scope and spirit of the present invention.

What is claimed is:

1. A readback system, comprising:
   a magnetic sensor that receives a sensor current, the sensor sensing magnetic bits at a bit frequency, and generating a sensor output; and
   a channel circuit that modulates the sensor current at a modulation frequency higher than the bit frequency, the circuit sampling the sensor output and combining multiple samples of the sensor output per magnetic bit into a combined sample output.

2. The readback system of claim 1 where in the magnetic sensor comprises a magnetoresistive sensor sensing magnetic bits stored on perpendicular magnetic recording media.

3. The readback system of claim 2 wherein a magnitude of the sensor current and a magnitude of a magnetic field from the magnetic bits are sufficiently small that the sensor output comprises amplitudes that do not exceed a multiplying range of the sensor output.

4. The readback system of claim 1 wherein the sensor output comprises an amplitude that is representative of a product of the magnitude of the modulated sensor current and a magnitude of a magnetic field from the magnetic bits.

5. The readback system of claim 1, wherein the channel circuit comprises:
   a timing circuit generating a modulation timing output that modulates the sensor current at a timing frequency that is a multiple of the bit frequency, the timing circuit generating a sampling output that defines multiple sample times per magnetic bit; and
   a sampler circuit that receives the sensor output and the sampling output and that generates the combined sample sampler output in which the multiple samples per magnetic bit are combined into a single sample per magnetic bit.

6. The readback system of claim 5, wherein the timing circuit receives an amplified sample of the sensor output, and the timing circuit synchronizes the timing of the modulation timing output during a synchronization interval as a function of the amplified sample.

7. The readback system of claim 6 wherein the modulation of the sensor current is turned off during the synchronization interval, and turned on after the synchronization interval.

8. The readback system of claim 1 wherein the channel circuit further comprises:

a local oscillator oscillating at the modulation frequency and an LC circuit that resonates at the modulation frequency, the local oscillator and the LC circuit coupling to the magnetic sensor to provide the modulation of the sensor current; and a demodulator circuit coupled to the sensor output and generating the combined sample output.

9. The readback system of claim 1 wherein the modulation of the sensor current comprises sinusoidal modulation.

10. The readback system of claim 1 wherein the modulation of the sensor current comprises pulse modulation.

11. A readback system, comprising:

a magnetoresistive sensor that receives a first portion of a sensor current at a magnetoresistive element in the magnetoresistive sensor, and that receives a second portion of a sensor current at a winding in the magnetoresistive sensor the sensor sensing magnetic bits at a bit frequency, and generating a sensor output; and a channel circuit that modulates at least one of the portions of the sensor current at a modulation frequency higher than the bit frequency, the circuit sampling the sensor output and combining multiple samples of the sensor output per magnetic bit into a combined sample output.

12. The readback system of claim 11, wherein the winding receives a DC portion of the sensor current.

13. The readback system of claim 11, wherein the magnetoresistive element receives a modulated portion of the sensor current.

14. the readback system of claim 11 wherein the magnetoresistive sensor receives a DC portion of the sensor current.

15. The readback system of claim 11 wherein the channel circuit comprises a synchronous demodulator circuit.

16. The readback system of claim 11 wherein the channel comprises a resonant LC circuit with a Q factor, and the magnetoresistive element is coupled to the resonant LC circuit and has a modulated resistance that modulates the Q factor.

17. A readback system, comprising:

a magnetoresistive sensor modulating a sensor output as a linear product of a sensor current applied to the magnetoresistive sensor and a magnetic field applied to the sensor by saturated magnetic bits moving relative to the sensor at a bit frequency; and a channel circuit that modulates the sensor current at a modulation frequency that is higher than the bit frequency; the channel circuit receiving the sensor output and demodulating the sensor output to provide multiple samples per magnetic bit, and the channel circuit combining the multiple samples per bit into a combined sample output.

18. The readback system of claim 17 wherein the magnetoresistive sensor comprises a tunneling magnetoresistive sensor.

19. the readback system of claim 17 wherein the magnetoresistive sensor comprise a giant magnetoresistive sensor.

20. the readback system of claim 17 wherein the channel circuit demodulates the sensor output with a synchronous demodulator circuit.

* * * * *